United States Patent
Zhou et al.

(10) Patent No.: US 12,045,134 B2
(45) Date of Patent: Jul. 23, 2024

(54) COPY DATA MANAGEMENT SYSTEM AND METHOD FOR MODERN APPLICATION

(71) Applicant: Aishu Technology Corp., Shanghai (CN)

(72) Inventors: Feng Zhou, Shanghai (CN); Hongfu He, Shanghai (CN); Sha Tong, Shanghai (CN)

(73) Assignee: AISHU TECHNOLOGY CORP., Shanghai (CN)

( * ) Notice: Subject to any disclaimer, the term of this patent is extended or adjusted under 35 U.S.C. 154(b) by 0 days.

(21) Appl. No.: 17/996,248

(22) PCT Filed: Oct. 28, 2020

(86) PCT No.: PCT/CN2020/124230
§ 371 (c)(1),
(2) Date: Oct. 14, 2022

(87) PCT Pub. No.: WO2021/208402
PCT Pub. Date: Oct. 21, 2021

(65) Prior Publication Data
US 2023/0214301 A1  Jul. 6, 2023

(30) Foreign Application Priority Data
Apr. 14, 2020 (CN) .......................... 202010290216.1

(51) Int. Cl.
*G06F 11/00* (2006.01)
*G06F 11/14* (2006.01)
*G06F 16/27* (2019.01)

(52) U.S. Cl.
CPC .......... *G06F 11/1435* (2013.01); *G06F 16/27* (2019.01)

(58) Field of Classification Search
CPC ...... G06F 11/1435; G06F 16/27; G06F 11/14; G06F 11/1448; G06F 11/1464; G06F 11/2094; G06F 16/128
See application file for complete search history.

(56) References Cited

U.S. PATENT DOCUMENTS

| | | |
|---|---|---|
| 9,529,808 B1 | 12/2016 | Sudarsanam et al. |
| 10,013,314 B2 | 7/2018 | Klose |

(Continued)

FOREIGN PATENT DOCUMENTS

| | | |
|---|---|---|
| CN | 101578599 A | 11/2009 |
| CN | 101854388 A | 10/2010 |

(Continued)

OTHER PUBLICATIONS

Chinese First Office Action issued in related Application Serial No. 202010290216.0 on Feb. 3, 2021.

(Continued)

*Primary Examiner* — Amine Riad
(74) *Attorney, Agent, or Firm* — Mark H. Whittenberger; Holland & Knight LLP

(57) ABSTRACT

A copy data management system for a modern application includes a modern application module and a copy data management module. The modern application module includes a service unit, an object storage gateway, a production object storage, and a database. The service unit is configured to generate a large object, a small object, and service metadata. The object storage gateway is configured to write and read the large object and the small object in the production object storage, merge small objects into a large object, and generate object metadata. The database is configured to store the service metadata and the object metadata. The copy data management module includes a metadata processing unit and a disaster recovery object storage. The metadata processing unit is configured to back up the (Continued)

database. The object storage gateway is also configured to back up the production object storage to the disaster recovery object storage.

8 Claims, 1 Drawing Sheet

(56) References Cited

U.S. PATENT DOCUMENTS

| | | | | |
|---|---|---|---|---|
| 11,341,234 | B1* | 5/2022 | Voss | G06F 11/1464 |
| 2012/0166867 | A1* | 6/2012 | Volvovski | G06F 16/128 |
| | | | | 714/E11.062 |
| 2015/0256548 | A1* | 9/2015 | Dolph | H04L 63/08 |
| | | | | 726/23 |
| 2017/0032013 | A1 | 2/2017 | Zheng et al. | |
| 2022/0138051 | A1* | 5/2022 | Yelheri | G06F 11/1469 |
| | | | | 711/162 |
| 2022/0342774 | A1* | 10/2022 | Butucea Panait | G06N 3/09 |
| 2023/0083104 | A1* | 3/2023 | Xiang | G06F 3/0659 |
| | | | | 707/692 |
| 2023/0134674 | A1* | 5/2023 | Quinn | G06F 11/1458 |
| | | | | 714/15 |
| 2023/0267131 | A1* | 8/2023 | Dageville | G06F 16/273 |
| | | | | 707/615 |

FOREIGN PATENT DOCUMENTS

| | | | |
|---|---|---|---|
| CN | 102457555 | A | 5/2012 |
| CN | 103838646 | A | 6/2014 |
| CN | 103875229 | A | 6/2014 |
| CN | 103930879 | A | 7/2014 |
| CN | 104133882 | A | 11/2014 |
| CN | 104978351 | A | 10/2015 |
| CN | 106686148 | A | 5/2017 |
| CN | 106790434 | A | 5/2017 |
| CN | 109067733 | A | 12/2018 |
| CN | 109976941 | A | 7/2019 |
| CN | 111581016 | A | 8/2020 |
| EP | 2230601 | A1 | 9/2010 |
| WO | 2021208402 | A1 | 10/2021 |

OTHER PUBLICATIONS

International Search Report in the related Application Serial No. PCT/CN2020/124230 on Jan. 27, 2021.

Ying, "The Design and Implementation an University Human Resource Managerment System Based on Cloud Storage," A Thesis Submitted to University of Electronic Science and Technology of China. School of Computer Science & Engineering. Master Thesis For Professional Degree. Dated Nov. 20, 2012.

* cited by examiner

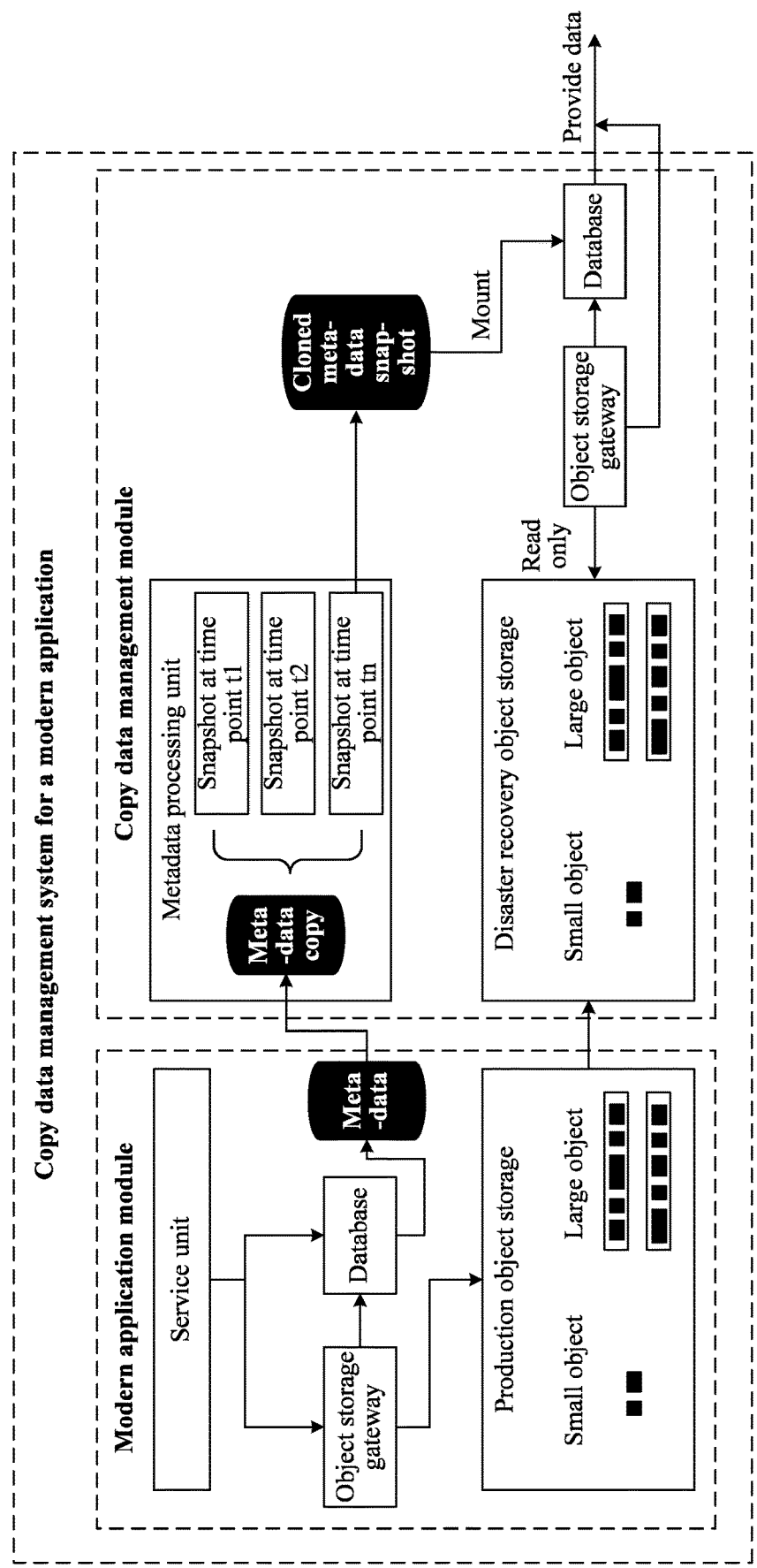

COPY DATA MANAGEMENT SYSTEM AND METHOD FOR MODERN APPLICATION

RELATED APPLICATIONS

The subject application is a U.S. National Stage application of International Application No. PCT/CN2020/124230, filed on Oct. 28, 2020, which claims the benefit of Chinese Patent Application No. 202010290216.1, filed on Apr. 14, 2020. The contents of each application incorporated herein by reference.

TECHNICAL FIELD

The present application relates to an object storage technology, for example, a copy data management system and method for a modern application.

BACKGROUND

With the rapid development of the Internet and the implementation of cloud technology, mobile office and cross-regional cooperation are becoming more and more popular. Under this background, many kinds of modern application systems based on object storage have emerged and developed rapidly. A large amount of data has poured into a modern application system that includes a service unit, a database, and an object storage. The modern application system has the following characteristics: The data is stored in an object storage, and the metadata is stored in a database. Moreover, the metadata in the database and the object storage are backed up so that copy data is generated, and when the modern application system is damaged and needs to be recovered, the copy data can be used for recovery, so as to ensure the data security of the modern application system.

However, data saved in the modern application system may be some small files. After the modern application system is damaged, objects in the object storage need to be recovered to a reconstructed system one by one. In the case where the small objects are massive, the recovery time is very long, not satisfying the requirement for a fast recovery of the system. Moreover, the copy data can only be used after the system is recovered, and thus cannot be utilized effectively. As a result, the instrumental value of the copy data cannot be exerted.

SUMMARY

The present application provides a copy data management system and method for a modern application to realize good security and make full use of stored data.

The present application may be implemented by the following technical solutions.

A copy data management system for a modern application is provided, which includes a modern application module and a copy data management module.

The modern application module includes a service unit, an object storage gateway, a production object storage and a database. The service unit is connected to the object storage gateway and the database. The service unit is configured to generate a large object, a small object and service metadata. The large object and the small object are sent to the object storage gateway. The service metadata is stored in the database. The object storage gateway is connected to the production object storage and the database. The production object storage gateway is configured to write and read the large object and the small object in the production object storage, merging the small objects into a large object and generating object metadata and storing the object metadata into the database. The database is configured to store the service metadata and the object metadata.

The copy data management module includes a metadata processing unit and a disaster recovery object storage. The metadata processing unit is connected to the database. The metadata processing unit is configured to back up the database and generate a metadata copy. The disaster recovery object storage is connected to the object storage gateway. The object storage gateway is also configured to back up the production object storage to the disaster recovery object storage.

The metadata processing unit is further configured to implement a recovery of the modern application module and copy utilization by using the metadata copy and a snapshot thereof.

The process of the copy utilization includes the following steps.

The metadata processing unit sequentially snapshots and clones metadata copy to generate a cloned metadata snapshot, mounts the cloned metadata snapshot to the database, and the object storage gateway reads a large object in the disaster recovery object storage in a read-only manner. The service unit is also configured to send an object writing request and an object read request to the object storage gateway.

The object storage gateway is configured to store the received the large object or the small object in the production object storage when receiving the object writing request, and merge the small objects to the large object when the data amount of the small objects in the production object storage reaches a set threshold value; in the case where an object read request is received, detect whether or not the object metadata exists in the database; in response to the detection result that the object metadata exists in the database, data of a specified position and length in the large object in the production object storage is accessed according to the object metadata; in response to the detection result that no object metadata exists in the production object database, the large object in the production object storage is directly read.

Recovery of the modern application module includes a damage recovery and a history recovery.

The damage recovery process includes the following steps: the metadata processing unit restores the latest metadata copy to the database, and the object storage gateway synchronizes the production object storage with the disaster recovery object storage.

The history recovery process includes the following steps: the metadata processing unit restores the snapshot of the metadata copy at a specified time point to the database, and the object storage gateway queries the database for a large object corresponding to the specified time point, and restores the large object to the production object storage.

The service metadata includes user information, a user permission, user file storage information, and an object name. The object metadata includes a name, an offset, and a length of the large object.

The object storage gateway uses an object storage S3 interface.

A copy data management method for a modern application is provided, which includes the following steps.

A service unit generates a plurality of large objects, small objects and service metadata, and sends the large object and the small object to the object storage gateway and stores the service metadata in the database; where the object storage gateway writes and reads the large object and the small object in the production object storage, merges the small objects into a large object, generates object metadata, stores the object metadata in a database; where the metadata processing unit backs up the database to generate the metadata copy, and the production object storage gateway backs up the production object storage to the disaster recovery object storage.

The metadata processing unit uses the metadata copy and the snapshot of the metadata copy to achieve the recovery of the database and production object storage, and the copy utilization.

The process of the copy utilization includes: the metadata processing unit sequentially snapshots and clones the metadata copy in sequence to generate a cloned metadata snapshot; mounts the cloned metadata snapshot to the database; and the object storage gateway reads a large object in the disaster recovery object storage in a read-only manner.

The preceding method also includes that the service unit sends an object writing request and an object read request to the object storage gateway.

When the object storage gateway receives the object writing request, the object storage gateway stores the received large object or small object in the production object storage, and when the data amount of the small objects in the production object storage reaches the set threshold value, the object storage gateway merges the small objects into a large object.

When the object storage gateway receives the object read request, the object storage gateway detects whether the metadata exists in the database. In response to the detection result that the object metadata exists in the database, the object storage gateway accesses the data of the specified position and length in the large object in the production object storage according to the object metadata. In response to the detection result that no object metadata exists in the database, the object storage gateway directly reads the large object in the production object storage.

Recovery of the production object database and the production object storage includes the damage recovery and the history recovery.

The damage recovery process includes the following steps: the metadata processing unit restores the latest metadata copy to the database, and the object storage gateway synchronizes the production object storage with the disaster recovery object storage.

The history recovery includes the following steps: the metadata processing unit restores the snapshot of the metadata copy at a specified time point to the database, and then the object storage gateway queries the database for the large object corresponding to the specified time point, and restores the large object to the production object storage.

The service metadata includes user information, a user permission, user file storage information, and an object name. The object metadata includes a name, an offset, and a length of the large object.

The object storage gateway uses an object storage S3 interface.

BRIEF DESCRIPTION OF DRAWINGS

FIG. 1 is a framework diagram of a copy data management system for a modern application according to an embodiment of the present application.

DETAILED DESCRIPTION

The present application is described below in conjunction with drawings and embodiments. The embodiments are implemented on the basis of the solution of the present application. The implementation manner and operation process are given in the embodiments, but the scope of the present application is not limited to the embodiments hereinafter.

Embodiment One

The present embodiment provides a copy data management system for a modern application. As shown in FIG. 1, the copy data management system for a modern application according to the present embodiment includes a modern application module and a copy data management module.

The modern application module includes a service unit, an object storage gateway, a production object storage and a database. The service unit is configured to generate large and small objects and service metadata. The object storage gateway is configured to write and read large objects and small objects in the production object storage, to merge the small objects into large objects, and to generate object metadata. The database is configured to store the service metadata and object metadata. The object metadata includes the name, the offset, and the length of the large object. The offset is the start position of a small object in a large object. The length includes the length of the small object. The service metadata is data required by the service unit to process the service. The service metadata is data required when the service unit processes a service. The service metadata is data processed by the service unit, including the user information, the user permission, the user file storage information, and the object name. The object storage gateway uses the object storage S3 interface. The address of the production object storage and disaster recovery object storage is changed to the address of the object storage gateway so that all operations on the production object storage and disaster recovery object storage are taken over by the object storage gateway.

The copy data management module includes a metadata processing unit and a disaster recovery object storage. The metadata processing unit is configured to back up the metadata, generate and store the metadata copy. The disaster recovery object storage is configured to back up the production object storage to achieve the purpose of protecting the production object storage.

The metadata processing unit uses the metadata copy and the snapshot of the metadata copy to realize the recovery of the modern application module and the copy utilization.

The process of the copy utilization is described below.

The metadata processing unit sequentially snapshots and clones the metadata copy to generate snapshots of the cloned metadata; mounts the cloned metadata snapshot to the database; the object storage gateway reads large objects in the disaster recovery object storage in a read-only manner; and provides data for systems, such as third-party data analysis, data mining, and development testing. In this way, not only the security of the production object storage is ensured, but also the data stored by the production object storage is fully made use of.

The service unit is also configured to send an object writing request and an object read request to the object storage gateway. When the object storage gateway receives the object writing request, the object storage gateway stores the large objects and the small objects into the production object storage. When the data amount achieves the set threshold, the object storage gateway merges the small objects into the large objects. When the object storage gateway receives the object read request, the object storage gateway detects whether the object metadata exists in the database. If the object metadata exists in the database, the object storage gateway accesses the data of the specified position and length in the large object according to the object metadata or the metadata copy. If the object metadata does not exist in the database, the object storage gateway directly reads the large object.

The recovery of the modern application module includes a damage recovery and a history recovery.

When the production object storage is damaged and needs to be recovered, the recovery process includes restoring the latest metadata copy to the database, and synchronizing the disaster recovery object storage to the production object storage.

When the production object storage needs to be recovered to the historical version to perform history recovery, the process includes: the metadata processing unit restores the snapshot of the metadata copy to the database; the metadata processing unit queries the database for the corresponding large object, and restores the large object to the production object storage so that the effect of restoring the production object storage to a historical time point can be achieved.

Many users in the document cloud have a large number of pictures, documents and other files stored in the production object storage. In order to improve the reliability and security of the data stored by the production object storage, data protection is needed. At the same time, the large amount of data has great value for big data analysis, development and testing, and the like.

The implementation manner is as described below.

The object storage gateway is deployed. Information of the production object storage and the disaster recovery object storage is configured into the object storage gateway. The address of the production object storage and disaster recovery object storage in the document cloud is modified to the address of the object storage gateway. The copy data management module is deployed. The production object storage is backed up to the disaster recovery object, and the database is backed up to the metadata processing unit to complete data protection. The metadata snapshot at a specified time point is cloned and mounted to the database, and the disaster recovery object storage is accessed by the object storage gateway to provide data for the systems for third-party data analysis, data mining, development and testing, and the like.

The large object and the small object in this embodiment correspond to a large file and a small file of the service unit, respectively.

The large file is a file whose data volume is greater than a threshold. The small file is a file whose data volume is less than or equal to the threshold.

Embodiment Two

A copy data management method for a modern application corresponding to embodiment one includes the following steps.

The service unit generates large and small objects and service metadata, stores the service metadata into the database, and sends an object writing request and an object read request to the object storage gateway.

When the object storage gateway receives the object writing request, it stores the large object and the small object in the production object storage. When the data amount of the small objects in the production object storage reaches the set threshold, the object storage gateway merges the small objects into a large object, generates object metadata, and stores the object metadata to the database. The object storage gateway uses the object storage S3 interface. The disaster recovery object storage backs up the production object storage. The object metadata includes the name, the offset and the length of the large object. The service metadata is the data processed by the service unit, including the user information, the user permission, the user file storage information and the object name.

When the object storage gateway receives the object read request, it detects whether the object metadata exists in the database. If the object metadata exists in the database, it accesses the data of the specified position and length in the large object according to the object metadata. If the object metadata does not exist in the database, the object storage gateway directly reads the large object.

The metadata processing unit uses the metadata copy and the snapshot of the metadata copy to realize the recovery of the database and production object storage and the copy utilization.

The process of the copy utilization is described below.

The metadata processing unit sequentially snapshots and clones the metadata copy to generate a cloned metadata snapshot and mounts the cloned metadata snapshot to the database; the object storage gateway reads the large objects in the disaster recovery object storage in a read-only manner; and provides data for the systems of third-party data analysis, data mining, development and testing, and the like, which not only ensures the security of the production object storage, but also makes full use of the data stored by the production object storage.

Recovery of the database and the production object storage includes a damage recovery and a history recovery.

The damage recovery process includes the following steps: the metadata processing unit restores the latest metadata copy to the database, and then synchronizes the production object storage with the disaster recovery object storage.

The history recovery includes that the metadata processing unit restores the snapshot of the metadata copy at the specified time point to the database, and the disaster recovery object storage queries the database for the corresponding large object, and restores the large object to the production object storage so that the recovery to the historical time point can be achieved.

Embodiment one and embodiment two propose a copy data management system and method for a modern application. According to the characteristics of the modern application system, by using the copy data management technology, the large and small objects, service metadata, and object metadata of the modern application system are protected, and the copy data is reused so that the value of the backup data is fully exerted. By implementing an object storage gateway, the small objects are merged into a large object so that the data in the object storage can be quickly migrated to the copy data management system and can be quickly restored when the restoring is required, which greatly improves the performance of data protection and solves the problem of data protection and full utilization in the modern application.

This application, through object storage gateway, merges small objects in the manner of object metadata access, and backs up the production object storage and the production object database, and correspondingly obtains the disaster recovery object storage and the metadata copy. Then the metadata copy is sequentially snapped and cloned, and the cloned metadata snapshot is obtained. In this manner, the speed of recovering the production object storage is fast. The cloned metadata snapshot is mounted to the disaster recovery object database, and the disaster recovery object storage is accessed in a read-only manner through the disaster recovery object storage gateway. As a result, the data stored in the disaster recovery object storage can be fully utilized, without affecting the security of the production object storage, ensuring a good security.

This application can perform the damage recovery and the history recovery of the production object storage. When the damage recovery is performed, the metadata processing unit restores the latest metadata copy to the production object database, synchronizes the disaster recovery object storage to the production object storage. When the history recovery is performed, the snapshot of the metadata copy at a specified time point is recovered in the production object database, and the disaster recovery object storage queries the database for the corresponding large object and restores the large object to the production object storage, which has a good security and is easy to operate.

What is claimed is:

1. A copy data management system for a modern application, comprising:
   a modern application module comprising a service unit, an object storage gateway, a production object storage, and a database, wherein the service unit is connected to the object storage gateway and the database and is configured to generate a large object, a small object, and service metadata, send the large object and the small object to the object storage gateway, and store the service metadata into the database; the object storage gateway is connected to the production object storage and the database, and the object storage gateway is configured to write and read the large object and the small object in the production object storage, merge small objects into a large object, generate object metadata, and store the object metadata into the database; and the database is configured to store the service metadata and the object metadata; and
   a copy data management module comprising a metadata processing unit and a disaster recovery object storage, wherein the metadata processing unit is connected to the database and is configured to back up the database and generate a metadata copy; the disaster recovery object storage is connected to the object storage gateway, and the object storage gateway is further configured to back up the production object storage to the disaster recovery object storage; and the metadata processing unit is further configured to perform a recovery of the modern application module and copy utilization by using the metadata copy and a snapshot of the metadata copy, wherein
   a process of the copy utilization comprises:
   the metadata processing unit snapshots and clones the metadata copy in sequence to generate a cloned metadata snapshot and mounts the cloned metadata snapshot to the database, and the object storage gateway reads a large object in the disaster recovery object storage in a read-only manner.

2. The system of claim 1, wherein the service unit is further configured to send an object write request and an object read request to the object storage gateway; and
   the object storage gateway is configured to:
   in response to receiving the object write request, store a received large object or small object into the production object storage, and in response to data amount of small objects in the production object storage reaching a set threshold, merge the small objects into a large object; and
   in response to receiving the object read request, detect whether the object metadata exists in the database; in response to a detection result that the object metadata exists in the database, access, according to the object metadata, data of a specified length at a specified position in the large object in the production object storage; and in response to a detection result that no object metadata exists in the database, read the large object in the production object storage.

3. The system of claim 1, wherein the recovery of the modern application module comprises a damage recovery and a history recovery, wherein
   a process of the damage recovery comprises the following: the metadata processing unit a latest metadata copy to the database, and the object storage gateway synchronizes the production object storage with the disaster recovery object storage; and
   a process of the history recovery comprises the following: the metadata processing unit restores a snapshot of the metadata copy to the database, wherein the snapshot is taken at a specified time point; and the object storage gateway queries the database for a large object corresponding to the specified time point and restores the large object to the production object storage.

4. The system of claim 1, wherein the service metadata comprises user information, a user permission, user file storage information, and an object name; and the object metadata comprises a name, an offset, and a length of the large object.

5. The system of claim 1, wherein the object storage gateway employs an object storage S3 interface.

6. A copy data management method for a modern application, comprising:
   generating, by the service unit, a large object, a small object, and service metadata, sending, by the service unit, the large object and the small object to the object storage gateway, and storing, by the service unit, the service metadata into the database; writing and reading, by the object storage gateway, the large object and the small object in the production object storage, merging, by the object storage gateway, small objects into a large object, generating, by the object storage gateway, object metadata, and storing, by the object storage gateway, the object metadata into the database; backing up, by the metadata processing unit, the database and generating, by the metadata processing unit, a metadata copy; backing up, by the object storage gateway, the production object storage to the disaster recovery object storage; and performing, by the metadata processing unit, a recovery of the database and a recovery of the production object storage and copy utilization by using the metadata copy and a snapshot of the metadata copy, wherein
   a process of the copy utilization comprises:
   snapshotting and cloning, by the metadata processing unit, the metadata copy in sequence to generate a cloned metadata snapshot and mounting the cloned metadata snapshot to the database; and reading, by the object storage gateway, a large object in the disaster recovery object storage in a read-only manner.

7. The method of claim 6, further comprising sending, by the service unit, an object write request and an object read request to the object storage gateway; and in response to receiving the object write request, storing, by the object storage gateway, a received large object or small object into the production object storage, and in response to data amount of small objects in the production object storage reaching a set threshold, merging, by the object storage gateway, the small objects into a large object; and in response to receiving the object read request, detecting, by the object storage gateway, whether the object metadata exists in the database; in response to a detection result that the object metadata exists in the database, accessing, according to the object metadata, data of a specified length at a specified position in the large object in the production object storage; and in response to a detection result that no object metadata exists in the database, reading the large object in the production object storage.

8. The method of claim 6, wherein a recovery of the database and the recovery of the production object storage comprise a damage recovery and a history recovery, wherein a process of the damage recovery comprises the following: restoring, by the metadata processing unit, a latest metadata copy to the database, and synchronizing, by the object storage gateway, the production object storage with the disaster recovery object storage; and a process of the history recovery comprises the following: restoring, by the metadata processing unit, a snapshot of the metadata copy to the database, wherein the snapshot is taken at a specified time point.

\* \* \* \* \*